June 4, 1929.   E. J. BLAKE   1,716,292
BATTERY CHARGING SYSTEM
Filed Sept. 2, 1925   2 Sheets-Sheet 1
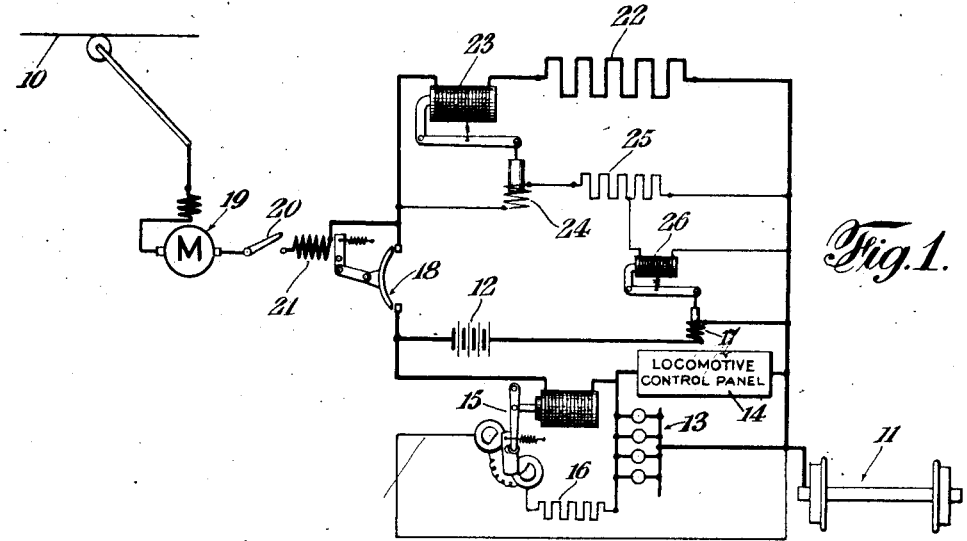
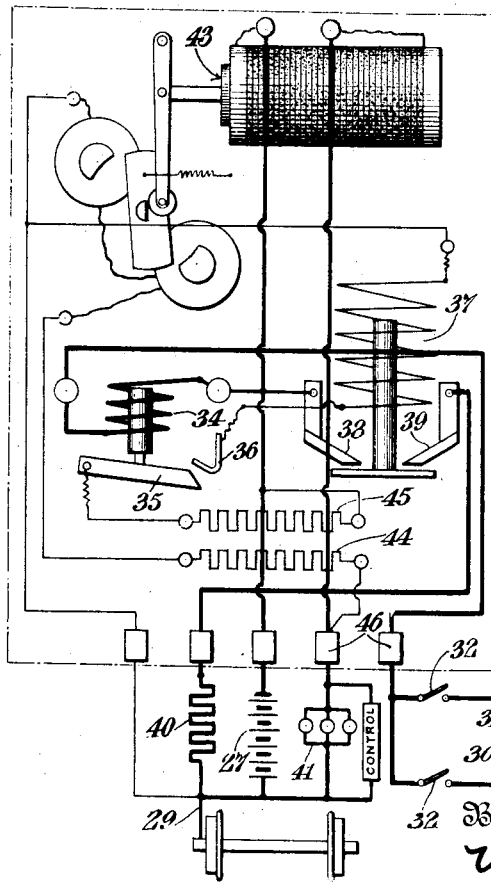
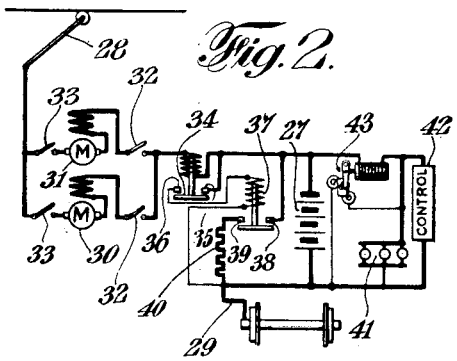
Eli J. Blake
Inventor
By his Attorneys
Ward, Crosby & Smith

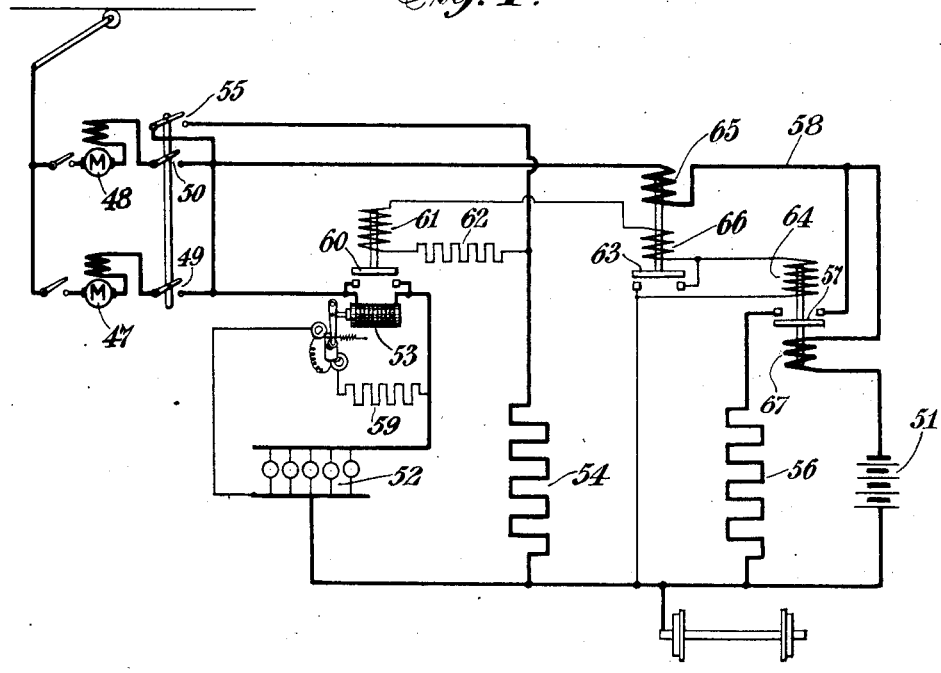

Patented June 4, 1929.

1,716,292

UNITED STATES PATENT OFFICE.

ELI J. BLAKE, OF BUFFALO, NEW YORK, ASSIGNOR, BY MESNE ASSIGNMENTS, TO SIMPLEX EQUIPMENT COMPANY, INC., OF NEW YORK, N. Y., A CORPORATION OF DELAWARE.

BATTERY-CHARGING SYSTEM.

Application filed September 2, 1925. Serial No. 53,988.

This invention relates to storage battery charging systems and particularly to a type of system which may be used for charging the batteries of a lighting circuit for electric locomotives.

One of the objects of this invention is to provide a system for charging a storage battery by connecting its circuit to the trolley or other source of power such as used for propelling an electric locomotive or train, a further object being to provide an improved system whereby a battery of comparatively low voltage, for example 32 volts, may be satisfactorily charged from such a source of power of relatively much higher voltage, for example 750 volts.

Further and more specific objects, features and advantages of the invention include the provision of relatively simple, dependable and efficient means for accommplishing the above stated objects, and still further objects, features and advantages will appear from the following specification and claims taken in connection with the accompanying drawings, in which Fig. 1 schematically illustrates a system embodying the invention.

Fig. 2 similarly illustrates a modified form of system embodying the invention in certain of its phases.

Fig. 3 is a diagram illustrating the system of Fig. 2 more in detail and showing a preferred arrangement of the system and its component parts as mounted upon a control panel. Fig. 4 illustrates a further embodiment of the invention.

Referring to Fig. 1, the numerals 10 and 11 respectively indicate a trolley and car truck which may comprise a source of variable current supply. The fluctuations in this current supply are occasioned by the variations in voltage resulting from the operation of the traction motors of an electric locomotive or train. At 12 a storage battery is indicated which may for example comprise sixteen conventional lead storage cells for delivering approximately 32 volts to a lighting circuit or other load. In the particular circuit illustrated the battery 12 supplies current to a lighting circuit 13 and a locomotive control panel 14. The control panel may include magnetic devices for controlling the traction motors or other elements of an electric locomotive. In order to provide a constant potential to the lighting circuit 13 a lamp regulator 15 may be used which may be of a conventional type or preferably of the type disclosed in the patent to Blake issued July 29, 1924, No. 1,503,085. The lamp regulator may be accompanied by a suitable heat compensating resistance 16.

For charging purposes one side of the battery may be grounded as at 11 through a solenoid 17, the purpose of which will be hereinafter described, while the other side of the battery may be connected to the trolley 10 through a suitable contact device 18 (hereinafter described) and in series with an auxiliary power consuming device 19.

The device 19 may comprise one of the auxiliary motors of an electric locomotive, as for example the blower motor used in ventilating the traction motors. Current through the circuit of the battery and motor may be cut off by a switch 20.

The contact device 18 may preferably be a magnetically operated switch provided with a solenoid 21. When the switch 20 is closed, sufficient current will be admitted through the solenoid 21 to operate the contact device 18 in a direction to close the circuit, placing the battery and motor in series with the trolley and ground.

During the operation of the motor at 19 the current passing therethrough may vary between wide limits or from approximately 40 to 80 amperes. In order that such variations in current will not have an undesirable effect upon the battery 12, a suitable circuit containing a fixed resistance 22 in series with an adjustable carbon pile 23 may be shunted around the battery 12. The resistances 22 and 23 serve to by-pass from the battery any current flowing through the motor 19 which is in excess of that required at the time for properly charging the battery.

The carbon pile 23 may comprise parts of a conventional form of lamp regulator with the exception that its solenoid is arranged to compress the carbon pile upon an increase in potential across the solenoid. In Fig. 1 a solenoid 24 is shown connected in series with a suitable heat compensating coil 25 for controlling the carbon pile. The elements 24 and 25 are in effect connected in series across the terminals of the battery 12 and are subject to the potential thereof.

Whenever the potential of the battery 12 tends to increase above a predetermined value, the solenoid 24 will act to compress the carbon pile 23, thus reducing the resistance of the by-pass circuit around the battery 12 and permitting a larger proportion of the current from the motor 19 to pass through the carbon pile and resistance 22. Accordingly, within certain limits the battery is supplied with a charging current of substantially constant potential.

However, if the current supply through the motor 19 is sufficient to furnish to the battery a current which even with the regulating action of the carbon pile 23, tends to be in excess of a predetermined standard, then in such circumstances the solenoid 17 above referred to acts upon a carbon pile 26 which may be termed a "multiplier carbon pile", to effectively neutralize such tendency.

It will be noted that the carbon pile 26 is bridged across a portion of the heat compensating resistance 25 and when the carbon pile is compressed the bridged portion of the resistance is in effect substantially short circuited. The solenoid 17 has a relatively low resistance winding which is connected in series with the battery. As long as the charging current is maintained below a predetermined standard a constant potential is maintained across the battery terminals by the action of the carbon pile 23 as above stated. However, when such predetermined standard is exceeded, the coil 17 acts to compress the carbon pile 26 with a consequent reduction in the voltage standard maintained across the battery and a resulting reduction in the charging rate.

The battery 12 may be for example of such capacity that it requires 30 amperes when available for charging. The solenoid 17 should then be designed to compress the multiplier carbon pile when the charging rate exceeds this value of 30 amperes. If the load circuit indicated at 13 and 14 is designed for example to require a variable current ranging from 0 to 40 amperes, the net current available for the battery ranges from 40 minus 40, or 0 amperes, to 80 minus 0, or 80 amperes (the current to the motor 19 varying from 40 to 80 amperes).

A suitable maximum voltage across the battery during charging would be 38 volts. The by-pass regulator winding 24 should then be designed to compress the carbon pile 23 whenever the battery voltage tends to exceed 38 volts. Under such circumstances, since the operating current for the solenoid would amount to about 2½ amperes, the combined resistance of the winding 24 and its heat compensating resistance may be 15 ohms.

The minimum battery voltage during the constant current charging cycle may be of the order of 34 volts. Accordingly, the multiplier carbon pile 26 should be connected at a point in the resistance 25 permitting it when compressed to reduce the combined resistance of the circuit through coil 24 to 13½ ohms or less. With such a design the circuit may receive the necessary 2½ amperes for the regulation of carbon pile 23 through the actuation of solenoid 24, even when the battery voltage is at 34 volts. It is desirable that the shunted section of the resistance 25 should not greatly exceed the required proportion in order that the somewhat indefinite maximum resistance of the carbon pile 26 may have only a small effect upon the constant potential standard of the coil 24.

With the circuit designed as above outlined the resistor 22 may have a resistance of substantially .48 ohms and an energy dissipating capacity of about 3080 watts. The resistance of the carbon pile will be found to vary between approximately .10 ohms and 5.0 ohms. When in the condition at which its resistance substantially equals that of the resistor, its energy dissipation will be greatest and will amount to about 25% of the maximum load which the resistor is required to dissipate.

In the modified form of circuit of Fig. 2 the battery 27 may be charged from power received from a trolley 28 and ground connection 29. In series with the battery circuit are blower motors or other auxiliary devices 30 and 31 corresponding to the auxiliary device 19 of the above described circuit. The motors 30 and 31 may be controlled by manually operable switches as at 32 and 33. Whenever current is applied to the motors by closing the switches 32 and 33 a magnetic switch 34 serves to close the circuit between the contacts 35 and 36. This in turn closes a circuit through a magnetic switch solenoid 37. This solenoid controls contacts 38 and 39 which when connected cause a fixed resistance 40 to become shunted across the battery 27.

A load circuit comprising lamps 41 and a control panel 42 may be supplied with current from the battery, such current being maintained at a substantially constant potential by means of a suitable form of conventional lamp regulator 43.

The relay or magnetic switch 34 serves to open the circuit through the solenoid 37 whenever the motors are not being operated, thereby avoiding possible unnecessary discharge of the battery.

The solenoid 37 is designed to close the circuit through the resistor 40 whenever the charging voltage tends to exceed a predetermined value, for example 38 or 39 volts. The resistor 40 thereupon serves as a by-pass corresponding to the circuit of elements 22 and 23 above described.

This circuit comprises a simple means for limiting the battery charging rate, and is sufficient and satisfactory for many installations, particularly if the fluctuations in the current supply are not excessive.

Fig. 3 as above stated illustrates the preferred arrangement of the various elements of Fig. 2 upon a control panel. Corresponding parts in Figs. 2 and 3 are designated by like numerals and accordingly a further detailed description of Fig. 3 is unnecessary with the exception that at 44 a suitable heat compensating resistance for the regulator 43 is illustrated, and a heat compensating resistance 45 for the circuit of solenoid 37 is furnished. Suitable binding terminals for the various units are illustrated as at 46.

In the circuit illustrated in Fig. 4, auxiliary motors as shown in Fig. 2 are indicated at 47 and 48 controlled by suitable switches as at 49 and 50 respectively. A battery at 51 may be charged by power received through the circuits of the motors 47 and 48. A lighting circuit or other suitable load is indicated at 52 provided with a constant potential regulator at 53.

A fixed by-pass resistance is indicated at 54 connected in series with the motors by a switch 55 which switch is associated with the switches 49 and 50 in a manner to be operable simultaneously therewith. The current through the auxiliary motors during their operation may vary approximately from 40 to 80 amperes and of this amount approximately from 18 to 22 amperes may be conducted through the resistance 54 and is thus by-passed around the battery.

A main by-pass resistance 56 is connected through a magnet switch 57 to the main power bus 58. This resistance is designed to by-pass away from the battery approximately from 33 to 40 amperes of the auxiliary motor current.

Referring again to the load circut the carbon pile potential regulator may be of any suitable type provided with a heat compensating resistance 59. A magnetic switch 60 is connected to short circuit the carbon pile to eliminate the carbon pile resistance when the blower circuit is cut off and the load circuit is being supplied by the battery. The switch 60 is operated by a magnet 61 having a voltage coil in series with a heat compensating resistance 62 and relay windings for controlling the switch 57 as hereinafter described. The winding 61 is connected to the blower circuit through the switch 55.

The switch 57 is controlled by a differential relay switch 63 connected to short circuit a voltage winding 64 which operates the switch 57. The relay switch is normally controlled by a charging current winding 65 connected in the bus 58. The relay switch is also under the influence of a small differential voltage winding 66 designed to prevent the operation of the relay by the maximum discharge current. The differential relay is designed to open the circuit through its contacts when the charging current amounts to approximately 18 amperes and is designed to close its circuit again when the charging current falls to aproximately 14.5 amperes. When the relay contacts are in closed position the winding 64 is idle and the resistance 56 is disconnected, whereas when the relay contacts are in open circuit position the winding 64 is energized and closes the switch 57 thus connecting in circuit the resistance 56, provided the battery has been charged to a potential of 38 volts.

The windings 64 and 66 may both be connected as shown in series with the voltage winding 61 above referred to.

A differential winding 67 of a few turns is connected in series with the battery and acts upon the switch 57 to prevent premature closing of the switch during a heavy rush of current, as occurs for example when starting the auxiliary motors.

With the system as connected in Fig. 4 the variations in the charging rate may be readily controlled within narrow limits both before and after the main by-pass resistance is connected in circuit.

Although the systems here described are illustrated in connection with the auxiliary motors as used in electric locomotives, it will be understood that the systems are adaptable for use in connection with various other power sources.

It is not desired to limit the invention to the details or particular examples herein described since many changes and modifications may be made and the invention in its broader aspects embodied in widely different forms. Hence it is desired to cover all modifications and forms coming within the language or scope of any one or more of the appended claims.

What is claimed as new and is desired to be secured by Letters Patent is:

1. In combination with a storage battery, a source of current of fluctuating voltage, said battery and another power consuming electrical device being connected in series with said source, and a circuit of adjustable resistance shunting said battery to by-pass part of the current supplied to said other device.

2. In combination with a source of current of fluctuating voltage, a storage battery, another power consuming electrical device connected to said source in series with said battery, a variable resistance shunted across the battery to by-pass current in excess of that required for charging the battery, and means for automatically disconnecting the battery from said other electrical device and said variable resistance when said source of current is not effective.

3. In a lighting circuit for electric locomotives, an auxiliary motor, a storage battery, means for charging the battery by connecting said battery in series with said motor, and means for maintaining a substantially constant potential charging current for the battery during normal fluctuations of the motor current.

4. In a lighting circuit for electrically driven vehicles, an auxiliary motor, a storage battery, means for charging the battery by connecting said battery in series with said motor, means for regulating the charging current at a substantially constant and predetermined potential during normal fluctuations of the locomotive current, and means for effecting a reduction of such potential when the battery current tends to exceed a predetermined standard.

5. In combination with a storage battery, a source of current of fluctuating voltage, said battery and another power absorbing device being connected in series to said source, by-pass resistance means shunted across the battery to divert current in excess of that required for charging the battery, said means including two resistances at least one of which is fixed and operatively connected whenever the battery is being charged, and means for automatically disconnecting the battery from said other power absorbing device and said resistance means when said source of current is cut off.

6. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, a variable resistance for controlling the division of current between said battery and said by-pass circuit, a coil responsive to battery voltage for controlling said variable resistance, a variable resistance for affecting the operation of said coil, and means responsive to battery charging current for operating said last-mentioned variable resistance.

7. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, means responsive to substantially fully charged condition of said battery for causing said by-pass circuit to by-pass sufficient current to protect the battery against overcharge, and means responsive to battery charging current for causing said by-pass circuit to by-pass sufficient current to protect the battery against charging current above a predetermined value.

8. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, resistance means for determining the current passing through said by-pass circuit, and means responsive to the intensity of battery charging current for controlling said resistance means.

9. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, resistance means for determining the current passing through said by-pass circuit, means responsive to battery voltage for controlling said resistance means, and means responsive to battery charging current for affecting said resistance means.

10. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, a variable resistance for controlling the division of current between said battery and said by-pass circuit, a voltage coil connected across said battery for controlling said variable resistance and adapted to prevent the voltage impressed upon the battery from exceeding a predetermined limit, and a coil responsive to battery charging current for affecting said variable resistance and adapted to prevent the charging current from exceeding a predetermined limit.

11. In a system of electrical distribution, in combination, a power circuit having included therein a translation device adapted to be operated therefrom and a storage battery connected in series with said device; and means for controlling the current flow through said battery without affecting the operation of said translation device, said means including a by-pass circuit around said battery, a variable resistance for controlling the division of current between said battery and said by-pass circuit, a coil responsive to battery voltage for controlling said variable resistance, a variable resistance in series with said voltage coil, and a coil responsive to battery charging current adapted to affect said last-mentioned variable resistance upon the battery charging current exceeding a predetermined limit.

In testimony whereof I have signed my name to this specification.

ELI J. BLAKE.